(12) United States Patent
Oh et al.

(10) Patent No.: US 11,063,490 B2
(45) Date of Patent: Jul. 13, 2021

(54) MOTOR AND MOTOR HOUSING

(71) Applicant: LG INNOTEK CO., LTD., Seoul (KR)

(72) Inventors: Sung Joo Oh, Seoul (KR); Woo Jin Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 141 days.

(21) Appl. No.: 16/316,488

(22) PCT Filed: Jun. 19, 2017

(86) PCT No.: PCT/KR2017/006371
§ 371 (c)(1),
(2) Date: Jan. 9, 2019

(87) PCT Pub. No.: WO2018/016744
PCT Pub. Date: Jan. 25, 2018

(65) Prior Publication Data
US 2019/0305634 A1 Oct. 3, 2019

(30) Foreign Application Priority Data

Jul. 18, 2016 (KR) .......................... 10-2016-0090916

(51) Int. Cl.
*H02K 5/22* (2006.01)
*H02K 11/215* (2016.01)
(Continued)

(52) U.S. Cl.
CPC ............. *H02K 5/225* (2013.01); *H02K 3/522* (2013.01); *H02K 5/02* (2013.01); *H02K 5/04* (2013.01);
(Continued)

(58) Field of Classification Search
CPC .......... H02K 5/225; H02K 11/21; H02K 7/08; H02K 5/04; H02K 5/02; H02K 7/083;
(Continued)

(56) References Cited

U.S. PATENT DOCUMENTS

| 5,097,168 A | 3/1992 | Takekoshi et al. |
| 5,767,596 A * | 6/1998 | Stark .................. H02K 5/00 29/596 |

(Continued)

FOREIGN PATENT DOCUMENTS

| CN | 1388627 | 1/2003 |
| CN | 201827096 | 5/2011 |

(Continued)

OTHER PUBLICATIONS

European Search Report dated Jan. 23, 2020 issued in Application No. 17831217.9.

(Continued)

*Primary Examiner* — Ahmed Elnakib
(74) *Attorney, Agent, or Firm* — KED & Associates LLP

(57) ABSTRACT

One embodiment relates to a motor comprising: a motor housing comprising a first housing and a second housing; a stator disposed in the motor housing; a coil wound around the stator; a rotor rotatably disposed in the stator; a shaft coupling with the rotor; a bearing for supporting the shaft; and a busbar terminal connected with an end portion of the coil, wherein the first housing comprises a body part and a first flange, the body part comprising a first region, and a second region extending from the first region, and the first flange extending in a vertical direction from an end portion of the second region, and the busbar terminal and the bearing are disposed in the first region. Accordingly, the structure of the motor may be simplified, and a gap due to tolerance among components may be minimized, and thus the reliability of the motor may be enhanced.

9 Claims, 7 Drawing Sheets

(51) Int. Cl.
*H02K 3/52* (2006.01)
*H02K 7/08* (2006.01)
*H02K 5/02* (2006.01)
*H02K 5/04* (2006.01)
*H02K 11/21* (2016.01)

(52) U.S. Cl.
CPC ............... *H02K 5/22* (2013.01); *H02K 7/08* (2013.01); *H02K 7/083* (2013.01); *H02K 11/21* (2016.01); *H02K 11/215* (2016.01); *H02K 2203/09* (2013.01)

(58) Field of Classification Search
CPC ........ H02K 5/22; H02K 3/522; H02K 11/215; H02K 2203/09
USPC ...................................... 310/89, 71
See application file for complete search history.

(56) References Cited

U.S. PATENT DOCUMENTS

| | | | |
|---|---|---|---|
| 6,404,086 B1* | 6/2002 | Fukasaku | F16F 1/3873 310/156.08 |
| 7,768,167 B2* | 8/2010 | Spaggiari | H02K 15/14 310/90 |
| 8,937,416 B2* | 1/2015 | Tanaka | H02K 5/08 310/89 |
| 2002/0175574 A1 | 11/2002 | Okazaki et al. | |
| 2005/0179329 A1 | 8/2005 | Okazaki et al. | |
| 2011/0140558 A1 | 6/2011 | Kinpara et al. | |
| 2012/0104887 A1 | 5/2012 | Tanaka et al. | |
| 2013/0099609 A1* | 4/2013 | Ikeno | H02K 11/33 310/52 |
| 2014/0001915 A1* | 1/2014 | Fukase | H02K 9/28 310/227 |
| 2017/0201152 A1 | 7/2017 | Haga et al. | |

FOREIGN PATENT DOCUMENTS

| | | |
|---|---|---|
| CN | 204497881 | 7/2015 |
| CN | 204538893 | 8/2015 |
| EP | 0 176 839 | 4/1986 |
| EP | 0 445 367 | 9/1991 |
| JP | S50155511 | 12/1975 |
| JP | S63662 | 1/1988 |
| JP | H07322557 | 12/1995 |
| JP | 2002-127921 | 5/2002 |
| JP | 2008-211960 | 9/2008 |
| JP | 4470524 | 6/2010 |
| JP | 2012-095451 | 5/2012 |
| KR | 10-2006-0025512 | 3/2006 |
| KR | 10-2010-0086758 | 8/2010 |
| WO | WO 2016/051904 | 4/2016 |

OTHER PUBLICATIONS

International Search Report (with English Translation) and Written Opinion dated Sep. 20, 2017 issued in Application No. PCT/KR2017/006371.
Chinese Office Action dated Apr. 29, 2020 issued in Application No. 201780044439.6.

* cited by examiner (a)

(b)

MOTOR AND MOTOR HOUSING

CROSS-REFERENCE TO RELATED PATENT APPLICATIONS

This application is a U.S. National Stage Application under 35 U.S.C. § 371 of PCT Application No. PCT/KR2017/006371, filed Jun. 19, 2017, which claims priority to Korean Patent Application No. 10-2016-0090916, filed Jul. 18, 2018, whose entire disclosures are hereby incorporated by reference.

TECHNICAL FIELD

The present invention relates to a motor including a motor housing.

BACKGROUND ART

A motor is an apparatus configured to convert electric energy to rotational energy using a force applied to a conductor in a magnetic field. Recently, with the expansion of a use of the motor, the role of the motor has become important. Particularly, as more electric devices are used in a vehicle, demands for the motor applied to a steering system, a braking system, a machinery system, and the like greatly increase.

Generally, a motor includes a rotatably formed shaft, a rotor coupled to the shaft, and a stator disposed in a housing. Here, a stator is installed to be spaced apart from a circumference of the rotor. In addition, a coil, which generates a rotational magnetic field, is wound around the stator to induce an interaction with the rotor so that the rotor rotates. As the rotor rotates, the shaft rotates to generate a driving force.

In addition, a busbar electrically connected to the coil is disposed at an upper end of the stator. The busbar includes a roughly ring shaped busbar housing and a busbar terminal coupled to the busbar housing and connected to the coil. Generally, the busbar terminal of the busbar is formed by pressing a metal plate such as a copper plate.

In this case, the busbar terminal may include a plurality of terminals directly connected to the coil. A part of the each of the terminals may be bent due to a spatial limitation or a position of a connecting terminal of the coil.

Meanwhile, the shaft may be rotatably supported by a bearing in the housing. Here, the bearing may be disposed to be supported in the housing or press-fitted to be installed in the busbar housing.

However, in the case of the above motor, since components have to be individually assembled in the housing during an assembly process, there is a problem in increasing a manufacturing cost.

In addition, since a gap is generated due to tolerances of the individually assembled components, there is a problem in declining reliability.

DISCLOSURE

Technical Problem

The present invention is directed to providing a motor including a motor housing which is insert-injection-molded with a busbar terminal and a bearing to simplify a structure thereof.

In addition, the present invention is directed to providing a motor including a motor housing in which a connector part connected to a connector is integrally formed at one side of the motor housing.

Accordingly, the present invention is directed to providing a motor including a motor housing in which a housing assembly is formed to simplify an assembly process.

In addition, the present invention is directed to providing a motor including a motor housing having a first housing and a second housing which are formed of different materials, wherein, particularly, a busbar terminal and a bearing are internally insert-injection-molded in the first housing to improve insulation and waterproof properties.

In addition, the present invention is directed to providing a motor in which adhesion between a motor housing and a cover using a centering rib formed to center the cover is improved.

Objectives that have to be solved according to the embodiments are not limited to the above described objectives, and other objectives which are not described above will be clearly understood by those skilled in the art from the following specification.

Technical Solution

One aspect of the present invention provides a motor including a motor housing including a first housing and a second housing, a stator disposed in the motor housing; a coil wound around the stator, a rotor rotatably disposed inside the stator; a shaft coupled to the rotor, a bearing which supports the shaft, and a busbar terminal connected to an end portion of the coil, wherein the first housing includes: a body part including a first region and a second region extending from the first region, and a first flange extending from an end portion of the second region in a direction perpendicular to the second region, and the busbar terminal and the bearing are disposed in the first region.

The first housing may further include a connector part which extends outward from the first region such that a space is formed inside the connector part, and one side of the busbar terminal may be disposed to be exposed to the space.

The first housing and the connector part which are integrally formed may be formed of a synthetic resin material.

The second housing may include a second body part and a second flange which extends from an end portion of the second body part in a direction perpendicular to the second body part, and the second flange may be disposed in contact with the first flange.

The second housing may further include a coupling part which protrudes from the second flange, and the coupling part may be coupled to a first hole formed in the first flange.

A second hole may be formed at a center of the coupling part.

As an end portion of the coupling part may be bent outward, the second housing may be fixed to the first housing.

The second body part, the second flange, and the coupling part may be integrally formed of a metal material. Here, the first housing may be formed of a synthetic resin material.

One side of the stator may be supported by an inner circumferential surface of the second region, and the other side thereof may be supported by an inner circumferential surface of the second housing.

The motor may further include a cover disposed to cover an opening formed in one side of the first region, wherein the cover may include a plate which covers the opening, a protrusion which protrudes from a lower surface of the plate in a direction perpendicular to the plate and has a cylindrical shape, and at least two centering ribs which protrude from an outer circumferential surface of the protrusion, and the cover is centered to an opening of the housing by the centering ribs.

The centering ribs may be disposed to be spaced a predetermined distance (h) from the lower surface of the plate.

The centering rib may be formed in a semi-cylindrical shape or a semi-spherical shape.

The centering rib may be in point or line contact with the inner circumferential surface of the first region.

The motor may further include an adhesive member configured to fix the cover to the first housing, wherein the adhesive member may be interposed between an inner circumferential surface of the first region and the protrusion.

The adhesive member may be disposed to cover a region of the centering rib except for a region in line or point contact with the inner circumferential surface.

A sensor part configured to detect rotation of the shaft may be further disposed in the first region.

Advantageous Effects

According to embodiments, in a motor including a motor housing including the above-described components, since the motor housing is insert-injection-molded with a busbar terminal and a bearing, a structure of the motor can be simplified.

In addition, since a motor housing in which a connector part connected to a connector is integrally formed at one side of the motor housing, a structure of the motor housing can be simplified.

Accordingly, since an assembly process can be simplified, a gap due to tolerances of the components can be minimized, and thus the reliability of the motor can be improved.

In addition, a position and a shape of a centering rib formed to center the cover can be adjusted to improve adhesion between the motor housing and the cover.

MODES OF THE INVENTION

Figure 1:
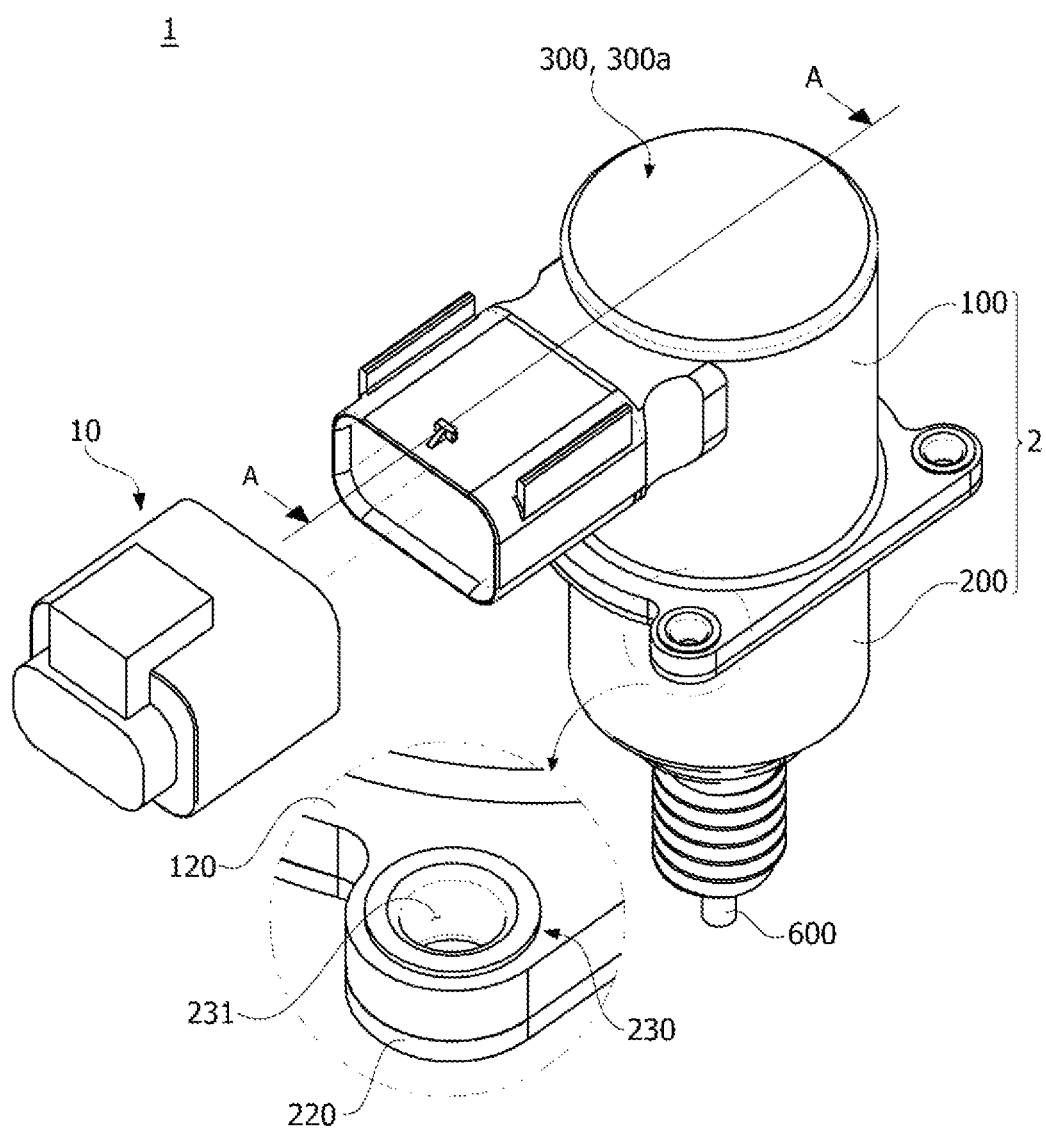
FIG. 1 is a view illustrating a motor according to an embodiment.

As the invention allows for various changes and numerous embodiments, specific embodiments will be illustrated in the drawings and described in detail in the written description. However, this is not intended to limit the present invention to specific modes of practice, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited to these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements.

In the description of embodiments, when an element is referred to as being "on or under" another element, the term "on or under" refers to either a direct connection between two elements or an indirect connection between two elements having one or more elements formed therebetween. In addition, when the term "on or under" is used, it may refer to a downward direction as well as an upward direction with respect to an element.

The terminology used herein is for the purpose of describing particular embodiments only and is not intended to be limiting to the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Example embodiments of the invention will be described below in more detail with reference to the accompanying drawings. Components that are the same or correspond to each other are rendered with the same reference numeral regardless of the figure number, and redundant descriptions thereof will be omitted.

Figure 2:
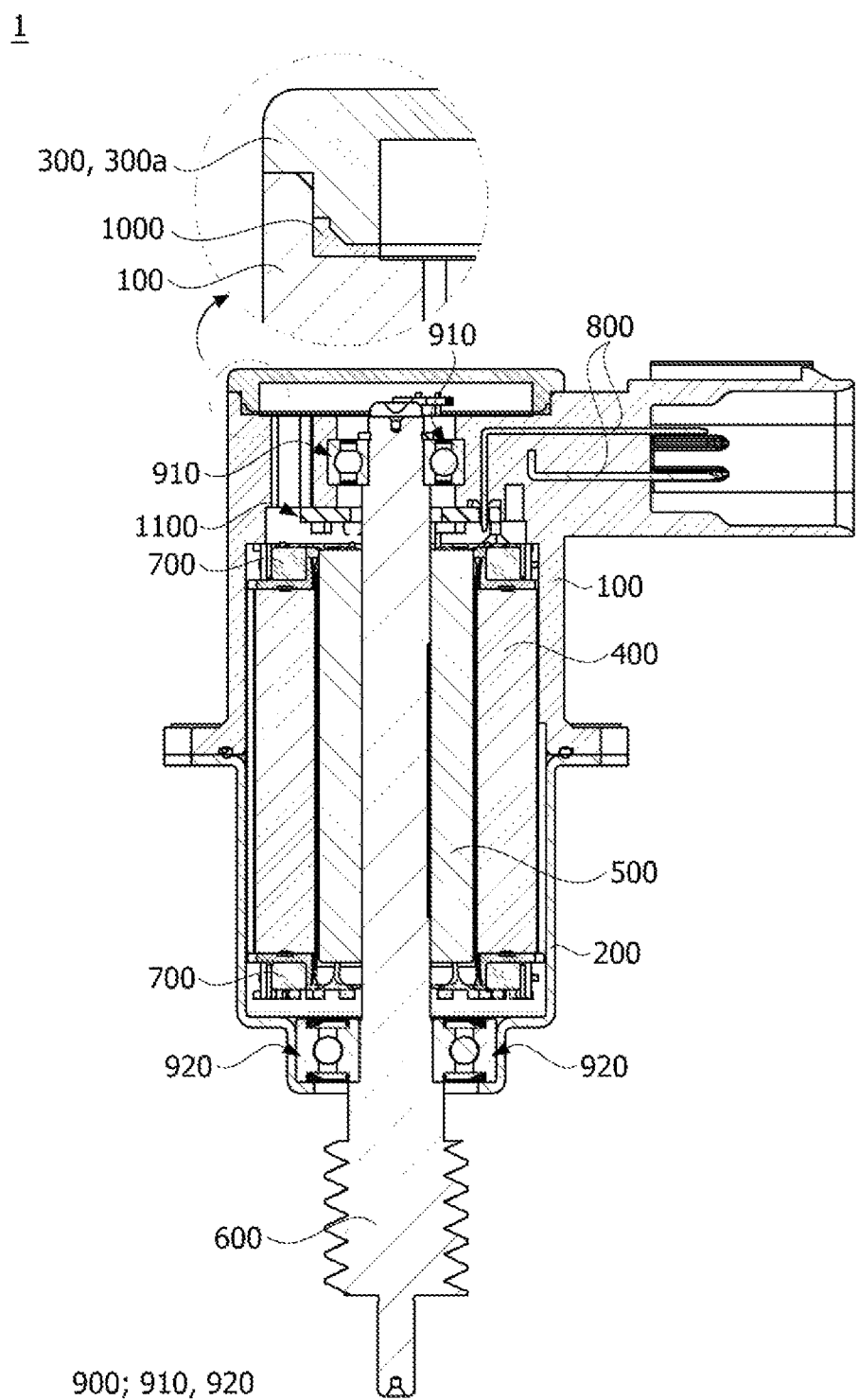
FIG. 2 is a cross-sectional view taken along line A-A of FIG. 1.
Figure 3:
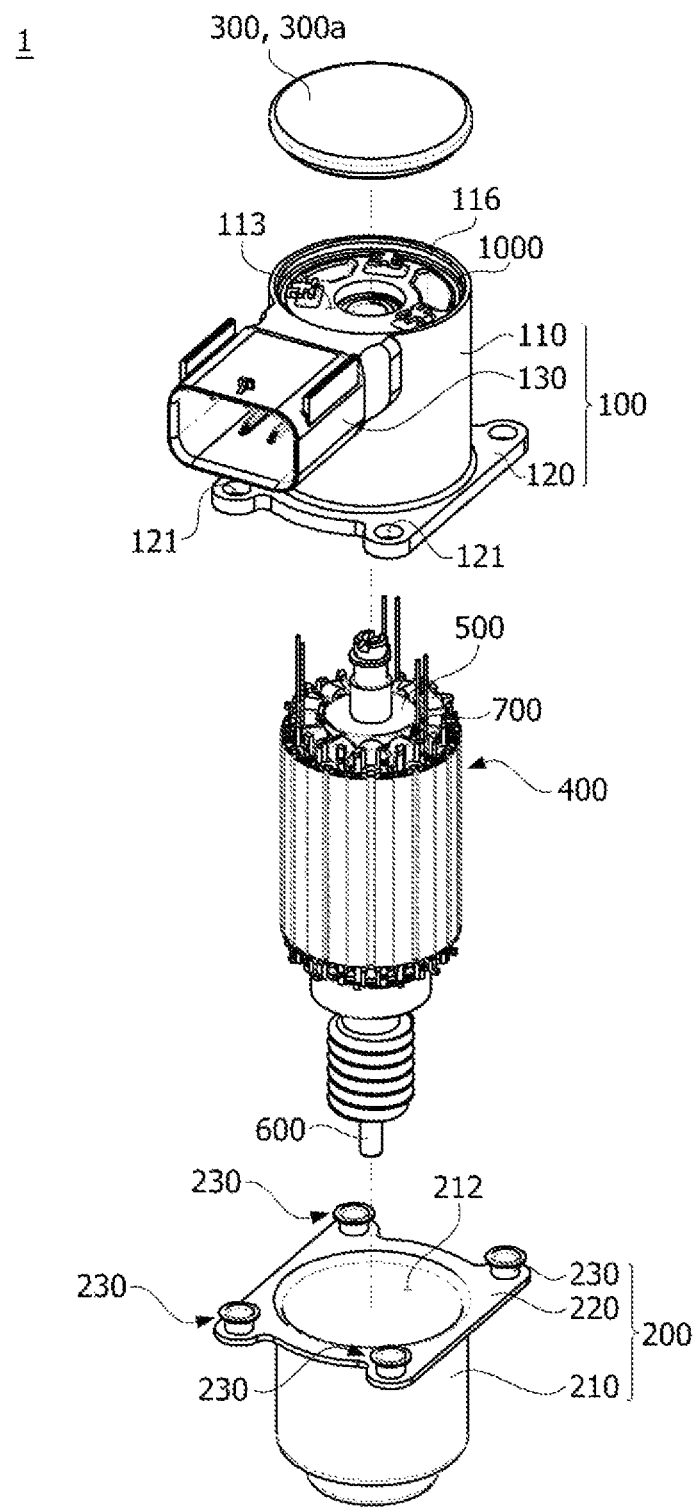
FIG. 3 is an exploded perspective view illustrating the motor according to the embodiment.
Figure 4:
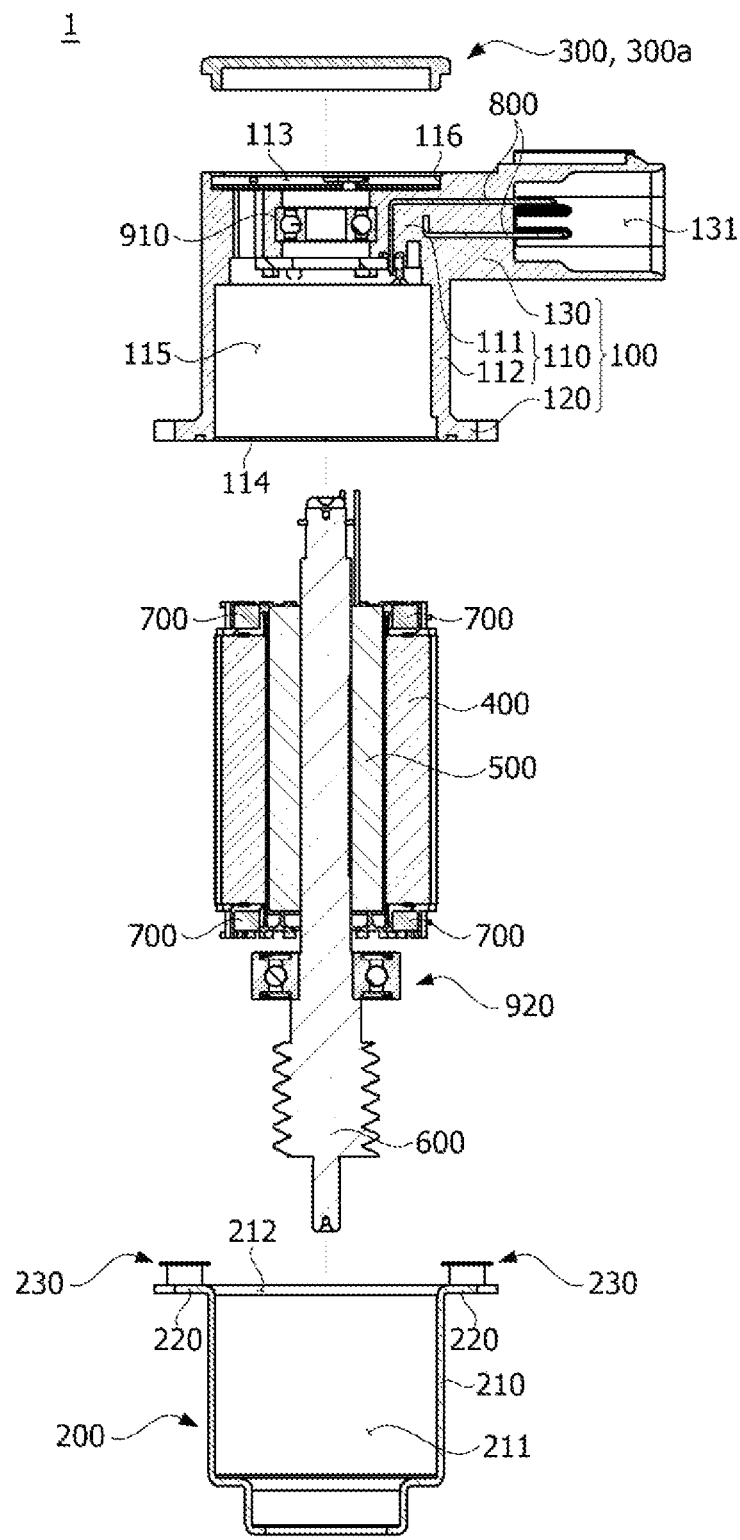
FIG. 4 is an exploded cross-sectional view illustrating the motor according to the embodiment.

FIG. 1 is a view illustrating a motor according to an embodiment, FIG. 2 is a cross-sectional view taken along line A-A of FIG. 1, FIG. 3 is an exploded perspective view illustrating the motor according to the embodiment, and FIG. 4 is an exploded cross-sectional view illustrating the motor according to the embodiment.

Referring to FIGS. 1 to 4, a motor 1 according to the embodiment of the present invention may include a motor housing 2, a cover 300 or 300a, a stator 400, a rotor 500, a shaft 600 which rotates with the rotor 500, a coil 700, a busbar terminal 800, and bearings 900.

Here, the bearings 900 are disposed on an outer circumferential surface of the shaft 600 such that the shaft 600 may rotate. In addition, the bearings 900 may include first bearings 910 and second bearings 920 disposed at an upper portion and a lower portion of the shaft 600.

Meanwhile, the motor housing 2 may include a first housing 100 and a second housing 200. In addition, the motor 1 may further include an adhesive member 1000 which fixes the cover 300 or 300a to the first housing 100.

In addition, the first housing 100 and the second housing 200 may be formed of different materials.

The first housing 100 may be formed of a synthetic resin material such as plastic.

In addition, the second housing 200 may be formed of a metal material. For example, the second housing 200 may be formed of aluminum, iron, or an alloy containing one of aluminum and iron.

The first housing 100 may include a first body part 110, a first flange 120, and a connector part 130 protruding outward from the first body part 110 to be electrically connected with an external terminal.

The first body part 110 may include a first region 111 and a second region 112. Here, the first body part 110 may be referred to as a first housing main body. In addition, the first region 111 may be referred to as an upper portion or main body of the first body part 110. In addition, the second region 112 may be referred to as a lower part or supporting part of the first body part 110.

In addition, openings 113 and 114 may be formed in one side and the other side of the first body part 110. In addition, a first accommodation space 115 may be formed inside the second region 112 of the first body part 110.

The first region 111 may have a predetermined thickness such that the first bearing 910 and a part of the busbar terminal 800 are disposed as illustrated in FIGS. 2 and 4. For example, the first region 111 may be formed in a cylindrical shape having the predetermined thickness.

In addition, the part of the busbar terminal 800 disposed in the first region 111 may be electrically connected to the coil 700.

In addition, the opening 113 may be formed in one side of the first region 111. Here, the opening 113 may communicate with the first accommodation space 115.

As illustrated in FIG. 3, the cover 300 or 300a may be disposed above the opening 113.

The second region 112 may extend from the first region 111.

Referring to FIGS. 1 to 4, the second region 112 may protrude from an edge of the first region 111 toward the second housing 200. For example, the second region 112 may be formed in a cylindrical shape protruding from the edge of the first region 111.

Accordingly, the first accommodation space 115 may be formed inside the second region 112.

In addition, the opening 114 communicating with the first accommodation space 115 may be disposed to face the second housing 200.

As illustrated in FIGS. 3 and 4, the first flange 120 may protrude outward from an outer circumferential surface of the first body part 110 at a side of the opening 114. For example, the first flange 120 may protrude outward from an end portion of the second region 112. Specifically, the first flange 120 may extend from the end portion of the second region 112 in a direction perpendicular to the second region 112.

In addition, first holes 121 may be formed in the first flange 120.

Four first holes 121 are illustrated in FIG. 3 as an example, but the present invention is not limited thereto. The first holes 121, of which the number is more than or less than four, may be formed in the first flange 120 in consideration of the volume of the motor and installation of an object (product).

The connector part 130 may protrude outward from the first body part 110 such that a space 131 is formed in the connector part 130. Accordingly, one side of the busbar terminal 800 is connected to the coil 700, and the other side thereof may be disposed to be exposed to the space 131.

In addition, a connector 10 configured to supply power may be connected to the connector part 130.

Meanwhile, the busbar terminal 800 and the first bearing 910 may be disposed in the first housing 100 through an insert injection molding.

Accordingly, a housing assembly, in which the first housing 100, the busbar terminal 800, and the first bearing 910 are integrally formed, may be formed. Therefore, a structure for assembling the motor 1 can be simplified.

Accordingly, when the motor 1 is assembled, an assembly process can be simplified using the housing assembly and a gap due to tolerances of the components can be minimized. Accordingly, the reliability of the motor housing 2 and the motor 1 can be improved.

The second housing 200 may include a second body part 210, a second flange 220, and coupling parts 230 protruding from the second flange 220. Here, the coupling parts 230 pass through the first holes 121 to be coupled to the first flange 120. Accordingly, the coupling parts 230 may protrude toward the first holes 121 of the first housing 100.

In addition, the second body part 210, the second flange 220, and the coupling parts 230 may be integrally formed of a metal material.

An opening may be formed in one side of the second body part 210, and a second accommodation space 211 may be formed inside the second body part 210. As illustrated in FIGS. 3 and 4, the second body part 210 may be formed in a cylindrical shape in which an opening 212 is formed at one side thereof. Here, the second body part 210 may be referred to as a second housing main body.

Accordingly, since the first flange 120 of the first housing 100 and the second flange 220 of the second housing 200 are disposed in contact with each other, an accommodation space in which the stator 400, the rotor 500, and the like may be disposed is formed inside the first accommodation space 115 and the second accommodation space 211. Here, the opening 212 of the second body part 210 is disposed to face the opening 114 of the first body part 110.

As illustrated in FIGS. 3 and 4, the second flange 220 may protrude outward from an outer circumferential surface of the second body part 210 at a side of the opening 212. Specifically, the second flange 220 may extend from an end portion of the second body part 210 in a direction perpendicular to the second body part 210.

As illustrated in FIG. 2, the second flange 220 may be disposed at the end portion of the second body part 210 to face and be in contact with the first flange 120.

The coupling parts 230 may protrude from the second flange 220 toward the first holes 121 of the first housing 100. Accordingly, a coupling structure of the first holes 121 and the coupling parts 230 serves to guide the first housing 100 and the second housing 200 to be coupled.

Meanwhile, the coupling part 230 may be formed in a cylindrical shape. For example, the coupling part 230 may be formed in a sleeve shape.

Accordingly, second holes 231 may be formed in centers of the coupling parts 230. Here, the second hole 231 may be referred as a coupling hole.

In addition, a coupling member (not shown), such as a screw or bolt, may pass through the second hole 231 to be coupled to the coupling parts 230.

Accordingly, the coupling part 230 in which the second hole 231 is formed reinforces the strength of a bearing surface due to the coupling force of the coupling member. In addition, since the coupling part 230 formed of a metal material supports the coupling member even when the first housing 100 is formed of a synthetic resin material, the damage of the first flange 120 of the first housing 100 due to the coupling force of the coupling member can be prevented.

That is, the coupling part 230 formed of the metal material may serve as a bushing to prevent the damage of the first flange 120 due to the coupling member.

Figure 5:
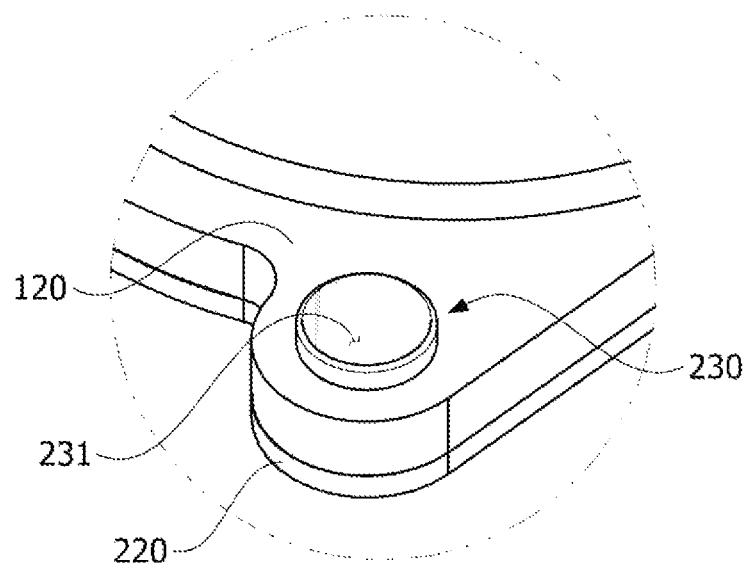
FIG. 5 is a view illustrating a process of fixing a second housing to a first housing of the motor according to the embodiment.
Figure 5:
Figure 5:
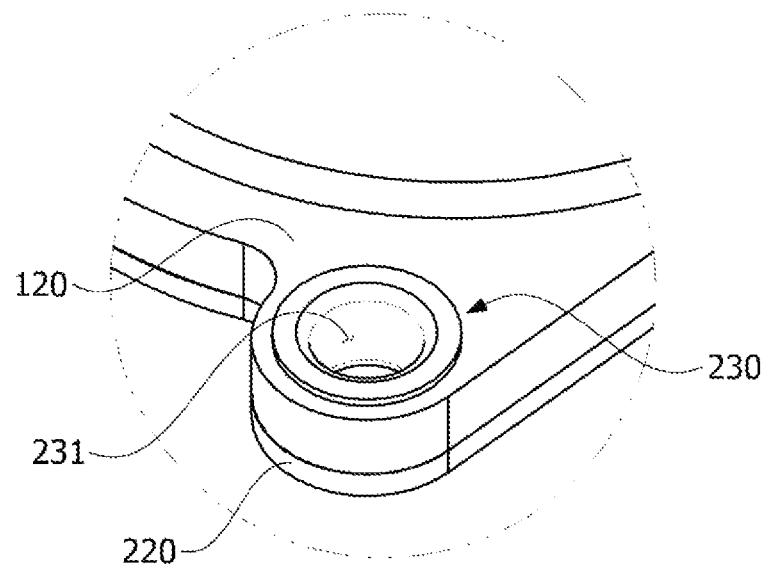

FIG. 5 is a view illustrating a process of fixing the second housing to the first housing of the motor according to the embodiment, FIG. 5A is a view illustrating coupling between the coupling part and the first hole of the motor according to the embodiment, and FIG. 5B is a view illustrating an end portion of the caulked coupling part after the coupling part and the first hole of the motor according to the embodiment are coupled.

As illustrated in FIG. 5A, the coupling part 230, in which the second hole 231 is formed, passes through the first hole 121 to be coupled to the first flange 120. In addition, as illustrated in FIG. 5B, the end portion of the coupling part 230 is bent outward during a caulking process. Accordingly, the second housing 200 is fixed to the first housing 100. In addition, since the end portion of the bent coupling part 230 supports the coupling member, the strength of the bearing surface due to the coupling force of the coupling member can be reinforced.

Accordingly, with the first hole 121 and the coupling structure of the coupling part 230 in which the second hole 231 is formed, functions of assembly of the first housing 100 and the second housing 200 which are formed of different materials and installation of a product (object) can be unified.

Referring to FIGS. 1 and 4, the cover 300 or 300a may be disposed to cover the opening 113.

In addition, the cover 300 or 300a may be fixed at a side of the opening 113 of the first housing 100 using the adhesive member 1000. Here, epoxy, silicone, urethane, synthetic rubber, ABS material, or the like may be used as a material of the adhesive member 1000.

That is, the adhesive member 1000 may be applied on an inner circumferential surface of the opening 113 of the first housing 100, the cover 300 or 300a may be disposed in the opening 113 of the first housing 100 through an insert fitting method and fixed by the adhesive member 1000.

Accordingly, the adhesive member 1000 may seal a gap between the first housing 100 and the cover 300 or 300a.

Figure 6:
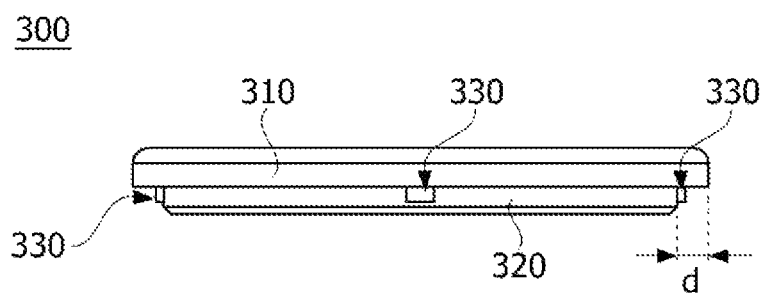
FIG. 6 is a view illustrating one example of a cover disposed on the motor according to the embodiment of the present invention.

FIG. 6 is a view illustrating an example of the cover disposed on the motor according to the embodiment of the present invention.

Referring to FIG. 6, the cover 300 includes a plate 310, a protrusion 320, and at least two centering ribs 330.

The plate 310 may be formed in a circular plate shape and disposed to cover the opening 113 of the first housing 100.

The protrusion 320 may protrude from a lower surface of the plate 310 in a direction perpendicular to the plate 310.

For example, the protrusion 320 may be disposed to be spaced a predetermined distance d from an edge of the lower surface of the plate 310 and may protrude downward from the lower surface of the plate 310.

Accordingly, the adhesive member 1000 may be interposed between the inner circumferential surface 116 of the opening 113 of the first body part 110 and the protrusion 320.

Meanwhile, the protrusion 320 may be formed in a cylindrical shape or ring shape in order to prevent the adhesive member 1000 from leaking inward from the protrusion 320 and optimize consumption of the adhesive member 1000.

The centering ribs 330 may protrude from an outer circumferential surface of the protrusion 320 in a radial direction of the protrusion 320. In addition, at least two centering ribs 330 may be disposed in a circumferential direction of the protrusion 320 to be spaced a predetermined distance from each other.

When the cover 300 is coupled to the opening 113 of the first housing 100, the centering ribs 330 are guided to the inner circumferential surface 116 of the opening 113 so that the cover 300 is centered without rattling.

Accordingly, the centering ribs 330 may prevent a phenomenon in which the cover 300 is pushed in one direction even when a dotted amount of the adhesive member 1000 is large or small. Accordingly, when the cover 300 is assembled with the opening 113, the flatness of the cover 300 is improved.

In addition, since the centering ribs 330 are guide to the inner circumferential surface 116 of the opening 113, an assembly reference of the cover 300 can be clarified.

An example of four centering ribs 330 disposed at intervals of 90° around the plate 310 are illustrated in FIG. 6, but the present invention is not limited thereto. At least two centering ribs 330 may be disposed, and in a case in which two centering ribs 330 are disposed, two centering ribs 330 may be symmetrically disposed with respect to a center of the plate 310.

Meanwhile, the centering ribs 330 may be in line or point contact with the inner circumferential surface 116 of the opening 113 formed in the first housing 100.

That is, since the centering ribs 330 are in line or point contact with the inner circumferential surface 116 to minimize a contact surface therebetween, a contact surface between the inner circumferential surface 116 and the adhesive member 1000 may be maximized. Accordingly, adhesiveness between the cover 300 and the adhesive member 1000 can be improved. For example, since the adhesive member 1000 is disposed to cover regions of the centering ribs 330 except for regions in line or point contact with the inner circumferential surface 116, the adhesiveness between the cover 300 and the adhesive member 1000 can be improved.

Figure 7:
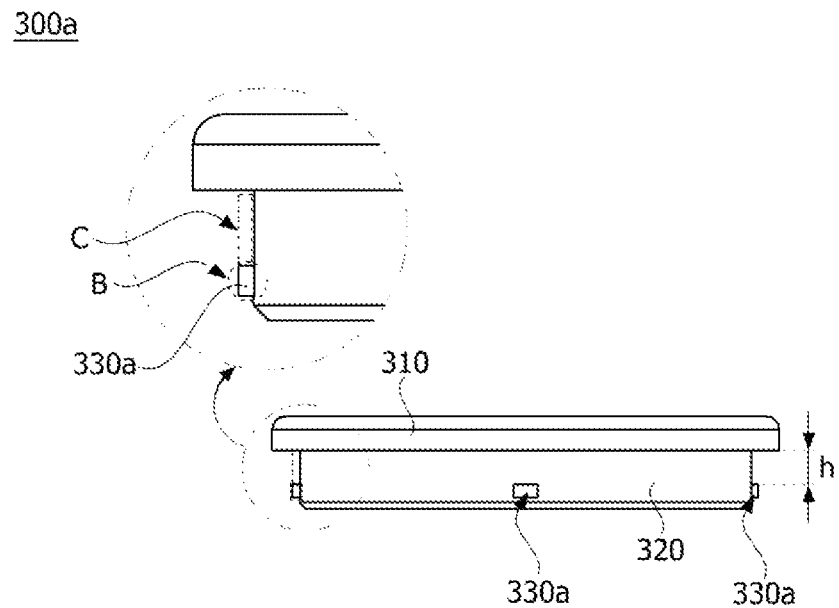
FIG. 7 is a view illustrating another example of the cover disposed on the motor according to the embodiment of the present invention.
Figure 8A:
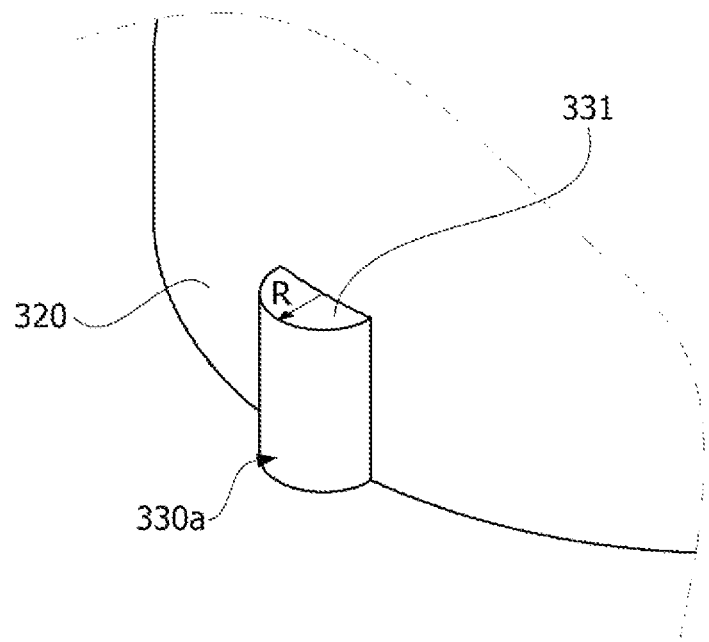
FIG. 8A is a view illustrating one example of a centering rib according to a region B of FIG. 7.
Figure 8B:
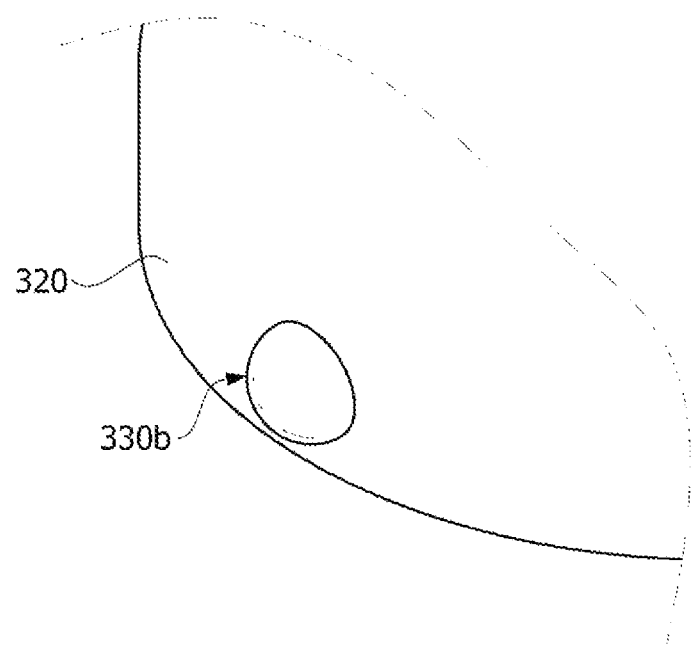
FIG. 8B is a view illustrating another example of the centering rib according to the region B of FIG. 7.

FIG. 7 is a view illustrating another example of the cover disposed on the motor according to the embodiment of the present invention. In addition, FIG. 8 is a view illustrating examples of the centering rib according to a region B of FIG. 7, FIG. 8A is a view illustrating one example of the centering rib, and FIG. 8B is a view illustrating another example of the centering rib.

Hereinafter, when the cover 300a is described with reference to FIGS. 7, 8A, and 8B, components of the cover 300a which are the same as those of the cover 300 are referred to as numbers which are the same as those thereof, and specific descriptions thereof will be omitted.

The cover 300a may include a plate 310, a protrusion 320, and at least two centering ribs 330a or 330b.

As illustrated in FIG. 7, the centering ribs 330a or 330b may be disposed to be spaced a predetermined distance h from a lower surface of the plate 310.

As illustrated in FIG. 8A, the centering rib 330a may be formed in a semi-cylindrical shape having a predetermined curvature R.

The adhesive member 1000 may be introduced into a space C formed between a lower surface of the plate 310 and an upper surface 331 of the centering rib 330a. Accordingly, adhesiveness between the cover 300a and the adhesive member 1000 may be further improved. In addition, a fixing force of the cover 300a to the housing 100 may be further improved due to curing of the adhesive member 1000 introduced into the space C.

Since the centering rib 330a is formed in the semi-cylindrical shape having the predetermined curvature R, the centering rib 330a is in linear contact with the inner circumferential surface 116 of the opening 113 of the first housing 100.

Meanwhile, as illustrated in FIG. 8B, the centering rib 330b may also be formed in a semi-spherical shape. Accordingly, the centering rib 330b is in point contact with the inner circumferential surface 116 of the opening 113 of the first housing 100. Therefore, a dotted amount of the adhesive member 1000 in the case of the centering rib 330b formed in the semi-spherical shape may be greater than that of the adhesive member 1000 in the case of the centering rib 330a formed in the semi-cylindrical shape.

Meanwhile, since the accommodation space is formed in the motor housing 2 according to the coupling of the first housing 100 and the second housing 200, the stator 400, the rotor 500, and the like may be disposed in the accommodation space. That is, the stator 400 and the rotor 500 may be disposed in the motor housing 2. Here, the rotor 500 may be rotatably disposed inside the stator 400.

Referring to FIG. 2, the stator 400 may be supported by the inner circumferential surfaces of the first housing 100 and the second housing 200.

The coil 700 configured to generate a rotating magnetic field may be wound around the stator 400. Here, the stator 400 may include one core or a plurality of divided cores which are coupled.

The rotor 500 may be disposed inside the stator 400, and the shaft 600 may be coupled to a center of the rotor 500.

A rotor core may be coupled to a magnet to form the rotor 500. For example, the rotor 500 may have a structure in which the magnet is disposed around an outer circumferential surface of the rotor core.

Accordingly, the rotor 500 rotates due to an electrical interaction between the coil 700 and the magnet, and when the rotor 500 rotates, the shaft 600 rotates to generate a driving force.

Meanwhile, the shaft 600 may be rotatably supported by the bearings 900 in the motor housing 2. As illustrated in FIG. 2, the bearings 900 may be installed in the first housing 100 and the second housing 200 to rotatably support the shaft 600.

For example, the first bearing 910 disposed in the first housing 100 may support the upper portion of the shaft 600, and the second bearing 920 disposed in the second housing 200 may support the lower portion of the shaft 600.

The busbar terminal 800 may be electrically connected to the coil 700 wound around the stator 400. In addition, a plurality of busbar terminals 800 may be disposed in the first housing 100. Here, a part of the busbar terminal 800 may be formed as a frame having a ring shape to improve space utilization.

As illustrated in FIGS. 2 and 4, one side of the busbar terminal 800 may be disposed to be exposed to the space 131. In addition, since the connector 10 configured to supply power to the connector part 130 is installed in the space 131, the busbar terminal 800 can be electrically connected to the connector 10.

In addition, the motor 1 may further includes a sensor part 1100 configured to detect rotation of the shaft 600. The sensor part 1100 may detect a magnetic force of a sensing magnet installed rotatably in conjunction with the rotor 500 to check a present position of the rotor 500 so that the rotation of the shaft 600 is detected.

The sensor part 1100 may include a plurality of magnetic elements and a printed circuit board (PCB) on which the magnetic elements are mounted. Here, the PCB may be disposed in the first region 111 of the first body part 110 through a thermal fusion.

An example of the sensor part 1100 disposed in the first region 111 is described, but the present invention is not limited thereto. The sensor part 1100 may also be included in the housing assembly with the first housing 100, the busbar terminal 800, and the first bearing 910 through an insert injection molding. That is, the sensor part 1100 may be disposed in the first region 111.

Although the present invention has been described with reference to the embodiments thereof, it will be understood by those skilled in the art that the invention may be variously changed and modified without departing from the spirit and scope of the present invention appended in the following claims. In addition, it should be interpreted that the differences related to the change and modification fall within the range of the present invention defined by the appended claims.

| Reference Numerals | |
|---|---|
| 1: MOTOR | 2: MOTOR HOUSING |
| 100: FIRST HOUSING | 110: FIRST BODY PART |
| 111: FIRST REGION | 112: SECOND REGION |
| 120: FIRST FLANGE | 121: FIRST HOLE |
| 130: CONNECTOR PART | 200: SECOND HOUSING |
| 210: SECOND BODY PART | 220: SECOND FLANGE |
| 230: COUPLING PART | 231: SECOND HOLE |
| 300, 300a: COVER | 310: PLATE |
| 320: PROTRUSION | 330, 330a, 330b: CENTERING RIB |
| 400: STATOR | 500: ROTOR |
| 600: SHAFT | 700: COIL |
| 800: BUSBAR TERMINAL | 900: BEARING |
| 1000: ADHESIVE MEMBER | 1100: SENSOR |

The invention claimed is:

1. A motor comprising:
a motor housing including a first housing and a second housing;
a stator disposed in the motor housing;
a coil wound around the stator;
a rotor rotatably disposed inside the stator;
a shaft coupled to the rotor, and extending in a first direction;
a bearing which supports the shaft; and
a busbar terminal connected to an end portion of the coil,
wherein the first housing includes:
a first body part including a first region and a second region extending from the first region in the first direction, a first flange extending from an end portion of the second region in a second direction perpendicular to the second region, and a connector part which extends, in the second direction, outward from the first region such that a space is formed inside the connector part, the busbar terminal and the bearing are disposed in the first region, a first side of the busbar terminal is connected to the end part of the coil within the first body part of the first housing, and a second side of the busbar terminal is disposed to be exposed to the space inside the connector part, wherein the second housing includes:

a second body part, a second flange which extends from an end portion of the second body part in the second direction perpendicular to the second body part, a coupling part which protrudes from the second flange in the first direction and passes through a first hole formed in the first flange, wherein a second hole is formed at a center of the coupling part, wherein, as an end portion of the coupling part is bent outward, the second housing is fixed to the first housing, a coupling member to pass through the second hole of the coupling part to be coupled to the coupling part, and wherein the first flange and the first body part are formed of a synthetic resin material, and wherein the second body part, the second flange, and the coupling part are integrally formed of a metal material, the second flange formed of the metal material is disposed in contact with the first flange formed of the synthetic resin material.

2. The motor of claim 1, wherein the first housing and the connector part are integrally formed of the synthetic resin material.

3. The motor of claim 1, wherein one side of the stator is supported by an inner circumferential surface of the second region, and the other side thereof is supported by an inner circumferential surface of the second housing.

4. The motor of claim 1, further comprising a cover disposed to cover an opening formed in one side of the first region, wherein:

the cover includes a plate which covers the opening, a protrusion which protrudes from a lower surface of the plate in a direction perpendicular to the plate and has a cylindrical shape, and at least two centering ribs which protrude from an outer circumferential surface of the protrusion; and the cover is centered to the opening of the housing by the centering ribs.

5. The motor of claim 4, wherein the centering ribs are disposed to be spaced a predetermined distance (h) from the lower surface of the plate.

6. The motor of claim 5, wherein the centering rib is formed in a semi-cylindrical shape or a semi-spherical shape.

7. The motor of claim 6, further comprising an adhesive member configured to fix the cover to the first housing, wherein the adhesive member is interposed between an inner circumferential surface of the first region and the protrusion.

8. The motor of claim 1, wherein a sensor part configured to detect rotation of the shaft is further disposed in the first region.

9. The motor of claim 1, wherein the coupling member is a screw or a bolt.

* * * * *